United States Patent

Rigby

[15] 3,641,543
[45] Feb. 8, 1972

[54] LOW-LEVEL DETECTOR AND DROP RATE MONITOR, PARTICULARLY FOR INTRAVENOUS FEEDING APPARATUS

[72] Inventor: Sherman Rigby, Boston, Mass.
[73] Assignee: Gordon Engineering Company, Wakefield, Mass.
[22] Filed: June 9, 1969
[21] Appl. No.: 831,522

[52] U.S. Cl. .................................. 340/239 R, 128/DIG. 13
[51] Int. Cl. .................. G08b 21/00, G05d 7/00, A61m 5/14
[58] Field of Search .................... 340/239, 244, 252, 282; 137/486; 222/59; 128/DIG. 13; 73/194 E

[56] References Cited

UNITED STATES PATENTS

| | | | |
|---|---|---|---|
| 1,128,013 | 2/1915 | Levison | 340/252 UX |
| 2,436,518 | 2/1948 | Lieffers | 340/282 X |
| 3,105,490 | 10/1963 | Schoenfeld | 340/244 X |
| 3,375,716 | 4/1968 | Hersch | 340/244 UX |
| 3,390,577 | 7/1968 | Phelps et al. | 340/239 UX |
| 3,450,153 | 6/1969 | Hildebrandt et al. | 137/486 |

*Primary Examiner*—John W. Caldwell
*Assistant Examiner*—Daniel Myer
*Attorney*—Morse, Altman & Oates

[57] ABSTRACT

In a low-level detector, a capacitance is established between an active electrode and grounded electrode as a function of a solution level in a container. A detector, which is periodically clamped to ground at a rate specified by a multivibrator, is operatively connected to the active electrode. The capacitance between the electrodes, which represents the solution level, is sensed in the detector. In a drop rate monitor, a signal from a multivibrator is applied to a first electrode and is capacitively coupled to a second electrode when a solution drop in a chamber appears therebetween. A stabilizing loop maintains the signal at the second electrode at a constant level. The coupled signal at the second electrode is applied to a detector which generates a signal in response to each drop. The signal from the detector is applied to a tachometer circuit for determination of the drop rate of the solution.

12 Claims, 3 Drawing Figures

3,641,543

LOW-LEVEL DETECTOR AND DROP RATE MONITOR, PARTICULARLY FOR INTRAVENOUS FEEDING APPARATUS

BACKGROUND AND SUMMARY

The present invention relates to monitoring devices, and particularly to an intravenous feeding apparatus monitoring device for denoting a low solution level in an intravenous bottle and an incorrect drop rate in an intravenous drop chamber. In an intravenous feeding apparatus, a solution in an intravenous bottle is supplied in drops to a drop chamber from which it is fed via intravenous tubing and a needle to a patient. Medical personnel are required to constantly monitor the intravenous feeding apparatus. If the intravenous solution in the bottle is completely consumed prior to removal of the needle, a blood clot is formed, thereby requiring reinsertion of the needle in order to continue intravenous feeding. If the solution in the bottle is administered too slowly, i.e., a low drop rate, the medicinal benefits of the solution could be ineffective, particularly when cardiac iontropic and vasoconstrictor agents are being administered. If the solution in the bottle is being administered too rapidly, i.e., a high drop rate, cardiac failure could be induced, particularly when sodium chloride and blood are being administered.

A primary object of the present invention is to provide, particularly for an intravenous feeding apparatus, a monitoring device characterized by a low solution level detector for denoting a low solution level and a drop rate monitor for indicating an incorrect drop rate, thereby eliminating the need for constant monitoring of the intravenous feeding apparatus by medical personnel. The low-level detector is characterized by a container for an intravenous solution, an active electrode and a grounded electrode on opposite sides thereof across which a capacitance is established as a function of the solution level within the container, a multivibrator for generating a square wave to the active electrode and a level detecting circuit for sensing the solution level as a function of the capacitance to the grounded electrode. The drop rate monitor is characterized by a drop chamber into which intravenous solution drips, a pair of electrodes on opposite sides thereof across which a capacitance is established as a function of the passage of each drop within the drop chamber, a multivibrator for generating a square wave to the first of the electrodes, a drop rate monitoring circuit for sensing the drop rate as a function of the capacitance between the pair of electrodes, a tachometer circuit for measuring the drop rate, and an alarm limit circuit for indicating an improper drop rate. The combination of the electrode structures, multivibrators, level detecting circuit and drop rate monitoring circuit is such as to provide precise and reliable solution level and drop rate information.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION

Figure 1:
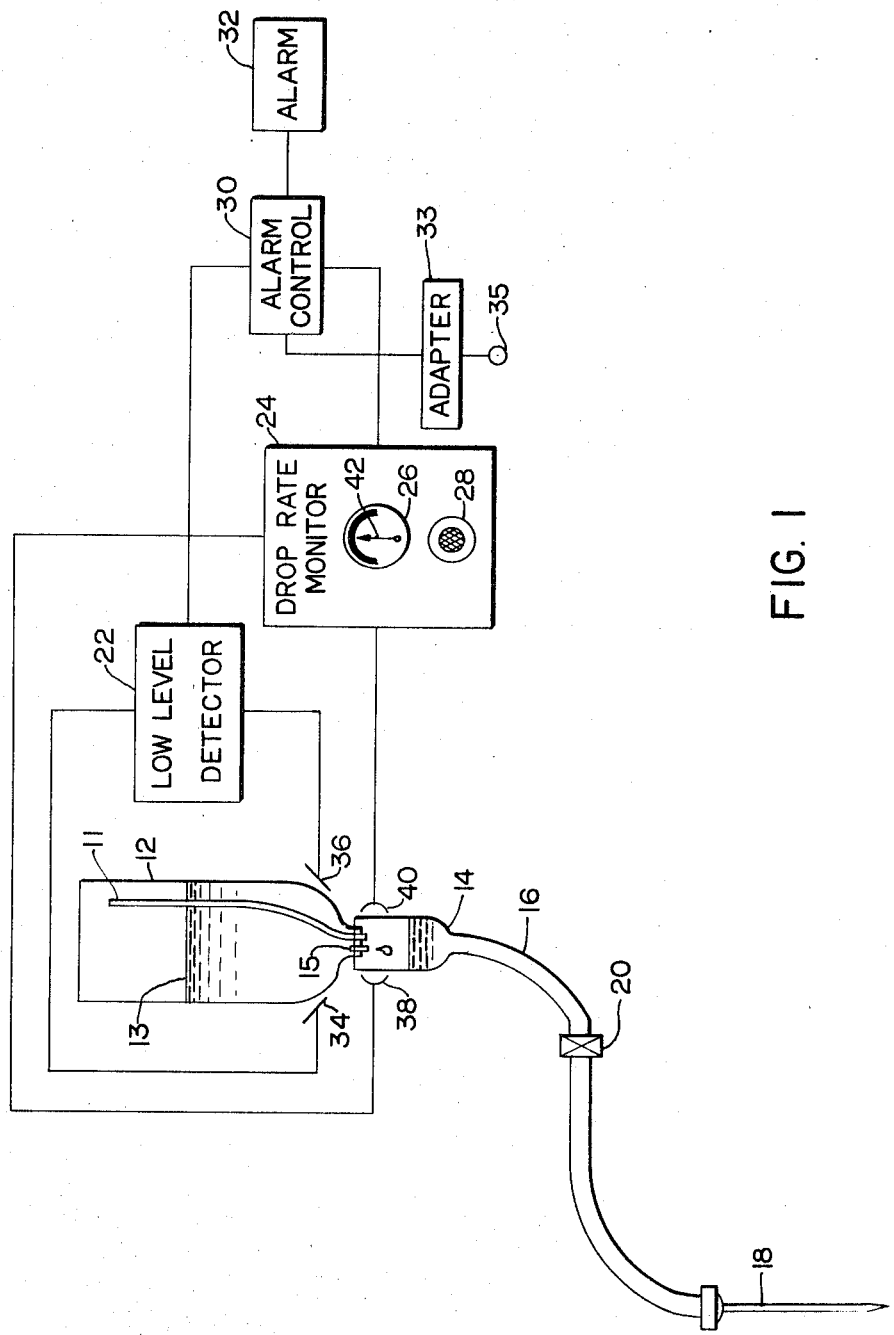
FIG. 1 is a block diagram of the intravenous feeding apparatus monitoring device.

Generally, the monitoring system of FIG. 1 comprises: a container 12, for example, an intravenous bottle, provided with an air line 11 and a valve 15 for allowing a solution 13 to exit therefrom; a drop chamber 14 for receiving the solution a drop at a time from bottle 12; tubing for transferring the solution from the drop chamber to a needle 18 which is inserted in a patient's vein, for example; a valve mechanism 20 for controlling the drop rate of solution into the drop chamber; a low-level detector 22 for indicating a low solution level in bottle 12; a drop rate monitor 24, including a meter 26 and a drop rate monitor control 28, for indicating an incorrect drop rate in chamber 14; and alarm control 30 for receiving signals from low-level detector 22 and drop rate monitor 24; and an alarm 32 for alerting medical personnel when a signal is applied to alarm control 30. It will be understood that the present invention, in alternative embodiments, is provided with an adapter 33, suitable for receiving an input from a patient call button 35 or the like, whereby existing nurse call systems are utilized and medical personnel are alerted by the same indicating device which is activated by the patient call button.

In the device of FIG. 1, low-level detector 22 senses electrical capacitance between conductors 34 and 36, which are placed opposite each other in juxtaposition with bottle 12. Since solution 13 is a conductor, the capacitance between conductors 34 and 36 is high when the solution level is high. As the solution level drops below conductors 34 and 36, capacitance between the conductors is decreased and a signal from low-level detector 22 is applied to alarm control 30. A signal from alarm control 30 is applied to alarm 32, whereby medical personnel are notified of the low-level condition. Drop rate monitor senses the drop rate of solution 13, which drips from bottle 12 into drip chamber 14, the drop rate being controlled by valve mechanism 20. A signal from drop rate monitor 24 is applied to an electrode 38, is capacitively coupled to an electrode 40 and is reapplied to the drop rate monitor. Electrodes 38 and 40 are affixed, for example, by means of a clip (not shown) to drop chamber 14, whereby the electrodes are diametrically opposed. Drop rate monitor control 28 is adjusted until a needle 42 of a meter 26 is at center scale. If the drop rate either increases or decreases with respect to the drop rate set on meter 26, needle 42 is rotated either to the left or to the right of center scale and a signal from drop rate monitor 24 is applied to alarm control 30. A signal from alarm control 30 is applied to alarm 32 so that medical personnel are notified of a drop rate change. In an alternative embodiment, alarm control 30 is activated in response to a signal applied thereto by call button 35 through adapter 33.

Figure 2:
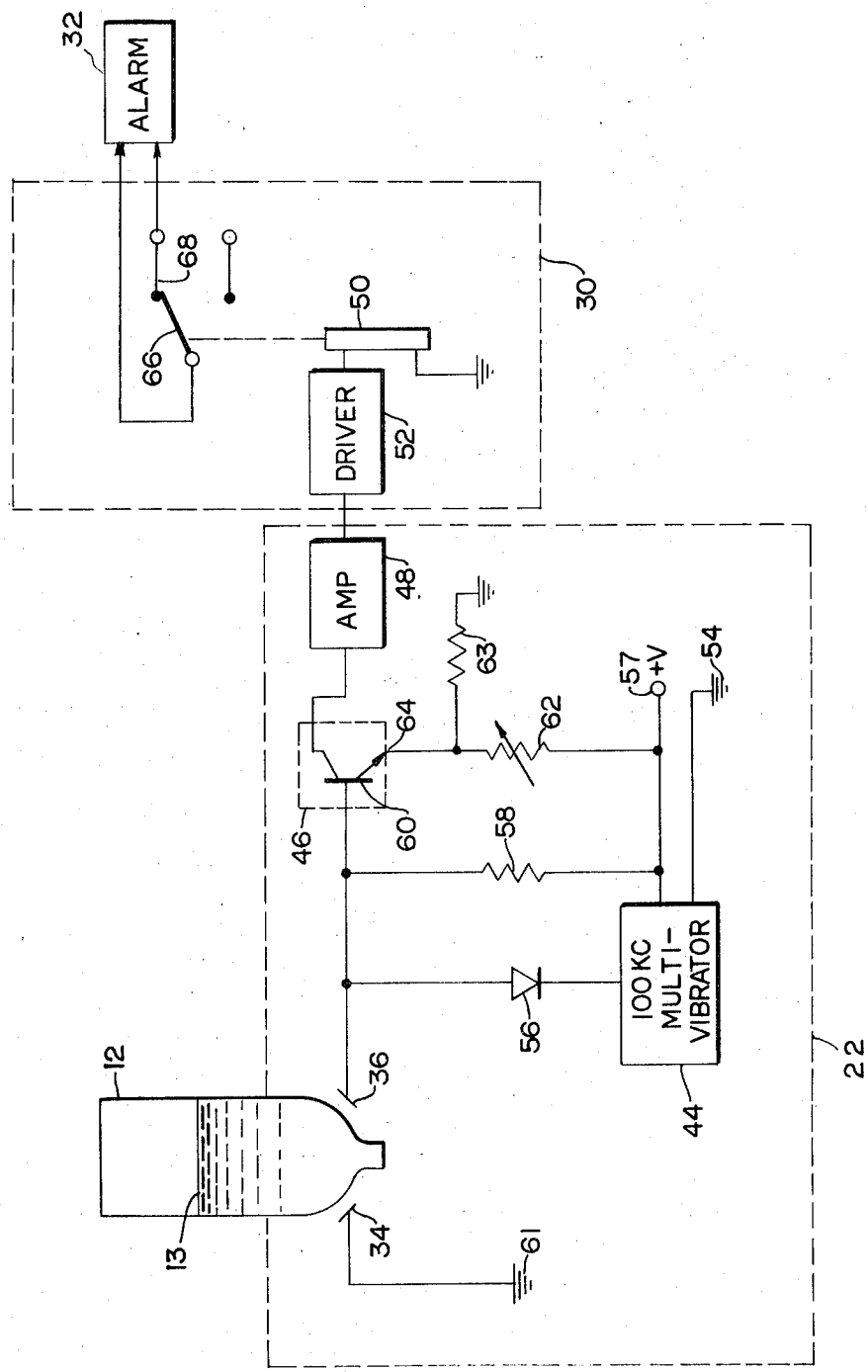
FIG. 2 is a detailed block and schematic diagram of the low-level detector of FIG. 1.

FIG. 2 is a block and schematic diagram of the low-level detector and alarm control hereinbefore mentioned in the discussion of FIG. 1. In general, low-level detector 22 comprises a multivibrator 44 for generating a square wave, for example of 100 kilohertz frequency, conductors 34 and 36 for developing capacitance, a detector 46 in the form of a transistor for detecting this capacitance and an amplifier 48 for generating a capacitance coupled signal. Generally, alarm control 30 comprises a relay 50 for activating alarm 32, and a driver 52 for controlling relay 50.

In the low-level detector of FIG. 2, detector 46 is periodically clamped to a ground 54 through a diode 56 at the rate (100 kilohertz) established by multivibrator 44. During the unclamped period, a current flows from a positive voltage V as at a terminal 57 through a resistor 58 to raise the voltage level at base 60 of detector 46. The magnitude of the base voltage rise is determined by the capacitance developed between conductors 34 and 36, which are connected to ground 61 and base 60, respectively. When the level of solution 13 is sufficiently high, this capacitance is high and the voltage rise of base 60 is prevented from exceeding a bias voltage on emitter 64, as determined by a setting of a variable resistor 62. Here detector 46 is in the nonconducting state. When the solution falls below a safe level, capacitance appearing between conductors 34 and 36 decreases so that the voltage of base 60 rises above the bias voltage. Here detector 46 is in the conducting state. When detector 48 is conducting, amplifier 48 signals a driver 52, which deenergizes relay 50. Relay contacts 66 and 68 thereby close in order to activate alarm 32.

Figure 3:
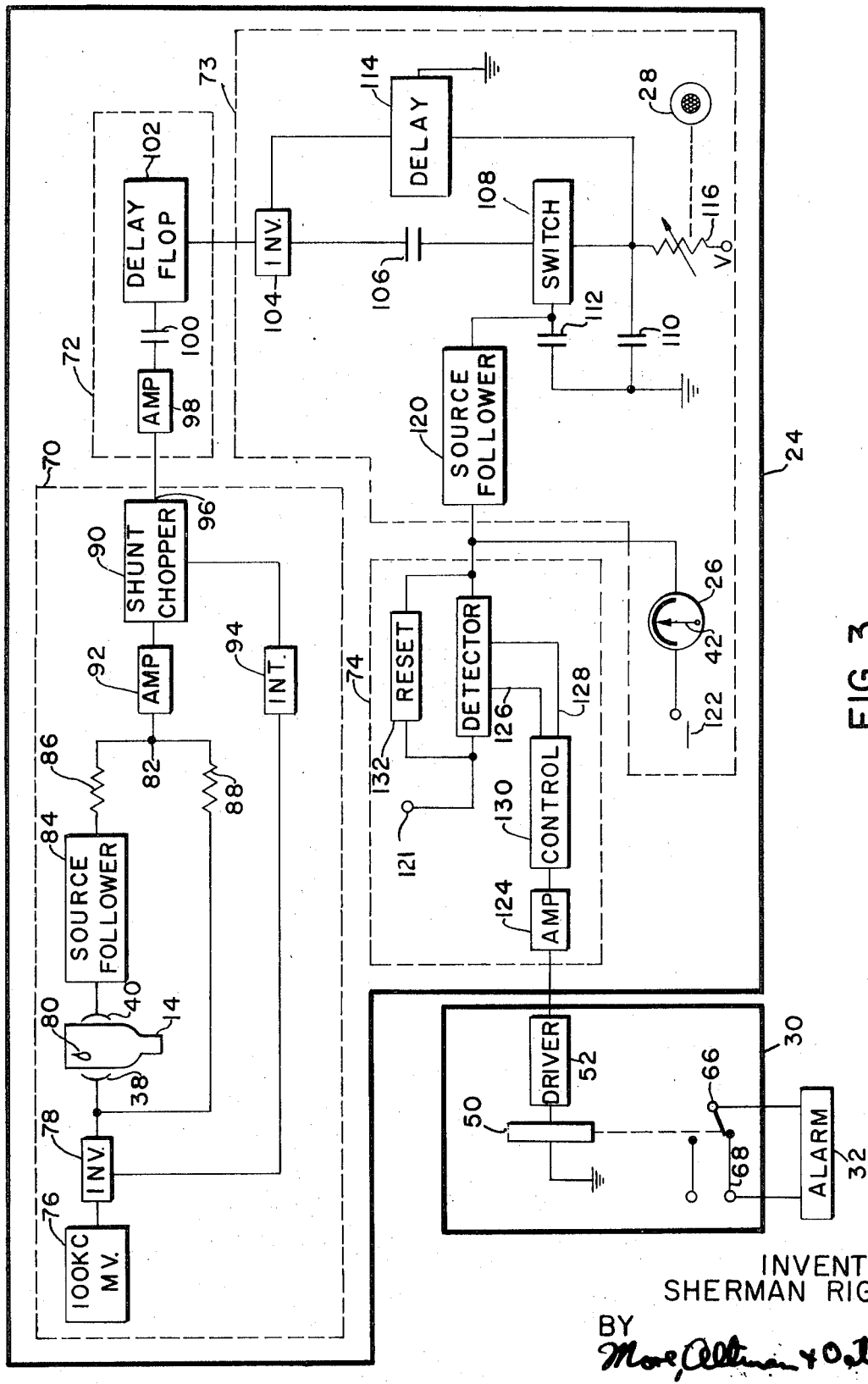
FIG. 3 is a detailed block and schematic diagram of the drop rate monitor of FIG. 1.

FIG. 3 is a block and schematic diagram of the drop rate monitor hereinbefore mentioned in the discussion of FIG. 1. In general, drop rate monitor 24 comprises a stabilizing loop 70 for maintaining a constant capacitance coupled signal at electrode 40, a detecting circuit 72 for monitoring the drop rate of solution 13 into drop chamber 14, a tachometer circuit 73 for measuring drop rate and a tolerance detector 74 for detecting high and low drop rates. Alarm control 30 and alarm 32 have been described in the discussion of FIG. 2.

In the drop rate monitor of FIG. 3, a square wave, for example of 100 kilohertz frequency, is generated by a multivibrator 76 and is applied to an inverter 78. In the preferred embodiment of this invention, the low-level detector of FIG. 2 and the drop rate monitor of FIG. 3 are combined into a single unit, as shown in FIG. 1, and one multivibrator is used for the level detector and drop rate monitor. Electrode 38 is excited by the 100 kilohertz square wave output of inverter 78. The square wave is capacitively coupled to electrode 40. As a drop 80, for example, passes between the electrodes, the capacitively coupled signal on electrode 40 is applied to a summing junction 82 through a source follower 84 and a resistor 86. The 100 kilohertz signal from inverter 78 also is applied to summing junction 82 through a resistor 88. The signal appearing across resistor 88 is 180° out of phase with respect to the signal appearing across resistor 86. Therefore, the net signal at summing junction 82 is the difference between the 100 kilohertz signal applied to electrode 38 and the 100 kilohertz capacitively coupled signal at electrode 40. The net signal is applied to a shunt chopper 90 through an amplifier 92. The output of shunt chopper 90 is summed by integrator 94 for application as a control signal to inverter 78. The amplitude of the square wave as at the output of inverter 78 is equal to the control signal as at the output of integrator 94. This stabilizing loop maintains the steady state 100 kilohertz signal at electrode 40 at a constant level. The response time of stabilizing loop 70 is relatively slower than the response time of detecting circuit 72. Therefore, as drop 80 falls into drop chamber 14, a momentary drop signal appears at an output 96 of shunt chopper 90. This momentary drop signal is amplified by amplifier 98 and is coupled through a capacitor 100 to delay flop 102. Each drop signal applied to capacitor 100 triggers delay flop 102. The output of delay flop 102, for example a 20 volt 50 millisecond pulse, is applied to an inverter 104. The output of inverter 104 is differentiated by a capacitor 106 and is applied to a switch 108. Momentarily, switch 108 conducts so that a voltage generated across a capacitor 110 is applied to a capacitor 112. Capacitor 110 is discharged through a delay 114, which is triggered by an output pulse from inverter 104. Current flow through a variable resistor 116 charge capacitor 110. The resistance setting of variable resistor 116, which is controlled by drop rate monitor control 28, is adjusted so that the voltage at capacitor 110 is predetermined, for example is 7 volts. If the drop rate is too slow, a higher voltage appears at capacitor 110 at the instance of the next drop and conversely, if the drop rate is too fast, a lower voltage appears at capacitor 110. Therefore, the voltage at capacitor 112, which is applied from capacitor 110, is representative of the time period between the last two drops falling within drop chamber 14. The voltage as at capacitor 112 is applied to meter 26 and to a detector 118 through a source follower 120. The sensing level for detector 118 is specified by a bias voltage as at a terminal 121. A fixed voltage 122 is applied also to meter 26 and needle 42 points to center scale when the drop rate is equal to the setting of drop rate monitor control 28. When the drop rate is other than the setting of control 28, needle 42 is rotated from the center scale position, for example, clockwise for a low drop rate and counterclockwise for a high drop rate. If the drop rate increases, amplifier 124 is energized by an output 126 of detector 118 through controller 130. If the drop rate decreases, amplifier 124 is energized by an output 128 of detector 118 through controller 130. When amplifier 124 is energized, driver 52 is deenergized, as is relay 50. In consequence, relay contacts 66 are closed and alarm 32 is activated. A reset 132 is provided for preventing an alarm indication while resistor 116 is being adjusted.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A device for detecting a low solution level in a container having interior and exterior surfaces, said device comprising:
   a. first and second conductor means mounted opposite one another in juxtaposition with the exterior surface of the container;
   b. detector means operatively connected to said first conductor means, said second conductor means connected to ground potential; and
   c. multivibrator means operatively connected to said first conductor means for periodically clamping said detector means to ground potential;
   d. a voltage level being applied to said detector means when said detector means is unclamped, the magnitude of said voltage level being determined by capacitance developed between said first and second conductor means, the magnitude of said capacitance being controlled by the solution level in the container.

2. The device of claim 1, wherein said device includes:
   a. alarm control means operatively connected to said detector means for generating an alarm signal when the solution level falls below a predetermined level, and
   b. alarm means operatively connected to said alarm control means for receiving said alarm signal and indicating a low solution level.

3. A device for monitoring the drop rate of a solution into a chamber, said device comprising:
   a. first and second electrode means mounted diametrically opposite one another and in juxtaposition with said chamber, a signal being capacitively coupled from said first electrode means to said second electrode means as a drop of the solution passes therebetween;
   b. stabilizing means operatively connected to said first and second electrode means for maintaining the capacitively coupled signal between said first and second electrode means at a constant level;
   c. detecting means operatively connected to said stabilizing mean for detecting and generating a signal in response to the signal capacitively coupled to said second electrode means; and
   d. tachometer means operatively connected to said detecting means for generating a signal corresponding to the time period between adjacent drops of solution into the chamber, whereby the signal generated by said tachometer means is the drop rate of the solution into the chamber.

4. The device as claimed in claim 3 including tolerance detector means operatively connected to said tachometer means for detecting drop rates above and below a specified level and generating a signal responsive to said drop rates.

5. The device of claim 4, wherein said device includes:
   a. alarm control means operatively connected to said tolerance detector means for generating an alarm signal when said tolerance detector means senses a high or low drop rate, and
   b. alarm means operatively connected to said alarm control means for receiving said alarm signal and indicating a high and low drop rate.

6. The device of claim 4, wherein said device includes:
   a. meter means operatively connected to said tolerance detector means for providing a visual indication of the drop rate,
   b. variable resistor means operatively connected to said tachometer means for controlling the signal generated by said tolerance detecting means, and c. drop rate monitor control means operatively connected to said variable resistor means for controlling said variable resistor means.

7. A device for monitoring the drop rate of a solution into a chamber, said device comprising:
   a. first and second electrode means mounted diametrically opposite one another and in juxtaposition with said chamber, a signal being capacitively coupled from said first electrode means to said second electrode means as a drop of the solution passes therebetween;
   b. stabilizing means operatively connected to said first and second electrode means for maintaining the capacitively coupled signal between said first and second electrode means at a constant level;
   c. detecting means operatively connected to said stabilizing means for detecting and generating a signal in response to the signal capacitively coupled to said second electrode means;
   d. tachometer means operatively connected to said detecting means for generating a signal corresponding to the time period between adjacent drops of solution into the chamber, the signal generated by said tachometer means being the drop rate of the solution into the chamber;
   e. tolerance detector means operatively connected to said tachometer means for detecting drop rates above and below a specified level; and
   f. meter means operatively connected to said tachometer and tolerance detector means for providing a visual indication of the drop rate of the solution into the chamber between said first and second electrode means.

8. A monitoring device for detecting a low section level in a container and monitoring the drop rate of said solution into a drop chamber, said device comprising:
   a. first and second conductor means mounted opposite one another in juxtaposition with the exterior surface of the container;
   b. first detector means operatively connected to said first conductor means, said second conductor means connected to ground potential;
   c. multivibrator means operatively connected to said first conductor means for periodically clamping said first detector means to ground potential;
   d. a voltage level being applied to said first detector means when said detector means is unclamped, the magnitude of said voltage level being determined by capacitance developed between said first and second conductor means, the magnitude of said capacitance being controlled by the solution level in the container;
   e. first and second electrode means mounted diametrically opposite one another and in juxtaposition with said chamber, a signal being capacitively coupled from said first electrode means to said second electrode means as a drop of the solution passes therebetween;
   f. stabilizing means operatively connected to said first and second electrode means for maintaining the capacitively coupled signal between said first and second electrode means at a constant level;
   g. second detecting means operatively connected to said stabilizing means for detecting and generating a signal in response to the signal capacitively coupled to said second electrode means; and
   h. tachometer means operatively connected to said second detecting means for generating a signal corresponding the time period between adjacent drops of solution into the chamber, whereby the signal generated by said tachometer means is the drop rate of the solution into the chamber.

9. The device as claimed in claim 8 including tolerance detector means operatively connected to said tachometer means for detecting high and low drop rates.

10. The device claim 9, wherein said device includes:
    a. alarm control means operatively connected to said tolerance detector means for generating an alarm signal when said solution level falls below a predetermined level and said drop rate varies beyond a specified limit, and
    b. alarm means operatively connected to said alarm control means for receiving said alarm signal and indicating low solution level and out-of-tolerance drop rate.

11. The device of claim 9, wherein said drop rate monitor means includes meter means operatively connected to said tolerance detector means for providing a visual indication of the drop rate.

12. The device of claim 10, wherein said device includes adapter means operatively connected to said alarm control means for accepting an input from a patient's call button and generating an alarm signal when said call button is activated.

* * * * *